US007348090B2

United States Patent
Kaneko et al.

(10) Patent No.: US 7,348,090 B2
(45) Date of Patent: Mar. 25, 2008

(54) FUEL CELL

(75) Inventors: Minoru Kaneko, Osaka (JP); Kunihiro Nakato, Osaka (JP)

(73) Assignee: Sanyo Electric Co., Ltd., Osako (JP)

( * ) Notice: Subject to any disclaimer, the term of this patent is extended or adjusted under 35 U.S.C. 154(b) by 866 days.

(21) Appl. No.: 10/181,811

(22) PCT Filed: Jan. 24, 2001

(86) PCT No.: PCT/JP01/00460

§ 371 (c)(1),
(2), (4) Date: Nov. 7, 2002

(87) PCT Pub. No.: WO01/56102

PCT Pub. Date: Aug. 2, 2001

(65) Prior Publication Data

US 2003/0054226 A1    Mar. 20, 2003

(30) Foreign Application Priority Data

Jan. 25, 2000  (JP)  ............................. 2000-016096
Jan. 23, 2001  (JP)  ............................. 2001-014836

(51) Int. Cl.
*H01M 2/00*  (2006.01)
*H01M 2/02*  (2006.01)
*H01M 4/00*  (2006.01)

(52) U.S. Cl. .............................. 429/34; 429/42; 429/44
(58) Field of Classification Search ................ 629/40, 629/42, 34, 38, 39
See application file for complete search history.

(56) References Cited

U.S. PATENT DOCUMENTS 4,367,208 A * 1/1983 Glasstetter et al. ...... 423/449.2
(Continued)

FOREIGN PATENT DOCUMENTS

CN            1202984 A        12/1998

OTHER PUBLICATIONS

Patent Abstract of Japan, Pub. No. 09-245800 of Sep. 19, 1997. See PCT search rpt.

(Continued)

*Primary Examiner*—Patrick Joseph Ryan
*Assistant Examiner*—Julian Mercado
(74) *Attorney, Agent, or Firm*—Kratz, Quintos & Hanson, LLP

(57) ABSTRACT

A fuel cell comprises a cathode (electrode catalyst layer), an anode (electrode catalyst layer), and a gas diffusion layer provided at least on one of the cathode and anode between a collector and the electrode catalyst layer and containing carbon having an oil absorption larger than that of a catalyst-supporting carbon used in the electrode catalyst layers. As a result, the dropping of the cell voltage due to external factor is suppressed, even if the cell temperature is low (room temperature to 50° C.). The water-absorption pressure of the water passage in the gas diffusion layer is higher than those of the electrode catalyst layers. The produced water and moving water in the cathode is absorbed into the water passage in the gas diffusion layer exhausted to the collector side. When a cell temperature is low, the evaporation speed of water from the collectors is lowered. However, the produced water and moving water in the cathode are physically attracted on the basis of the water-absorbing pressure of the gas diffusion layer and discharged toward the collector side, so that the reduction of the cell voltage is prevented.

4 Claims, 2 Drawing Sheets

U.S. PATENT DOCUMENTS

| | | | | |
|---|---|---|---|---|
| 4,876,115 | A | * | 10/1989 | Raistrick .................... 427/115 |
| 5,350,643 | A | * | 9/1994 | Imahashi et al. ............. 429/33 |
| 5,677,074 | A | * | 10/1997 | Serpico et al. ................ 429/43 |
| 5,783,325 | A | * | 7/1998 | Cabasso et al. ............... 429/42 |
| 5,998,057 | A | | 12/1999 | Koschany et al. ............ 429/42 |
| 6,007,933 | A | * | 12/1999 | Jones ......................... 429/38 |

OTHER PUBLICATIONS

Patent Abstract of Japan, Pub. No. 08-117598 of May 14, 1996. See PCT search rpt.
Patent Abstract of Japan, Pub. No. 11-045733 of Feb. 16, 1999. See PCT search rpt.
Patent Abstract of Japan, Pub. No. 2000-100448 of Apr. 7, 2000. See PCT search rpt.
Chinese Office Action dated Apr. 16, 2005 (English version).

* cited by examiner

FUEL CELL

FIELD OF THE INVENTION

The present invention relates to a fuel cell, and more particularly relates to a polymer electrolyte fuel cell having an improved gas diffusion layer for generating power by using a humidifying reactant gas.

Background Art

A fuel cell denotes a cell for directly taking out the chemical energy of a fuel (such as hydrogen) as electrical energy on the basis of an electrochemical reaction. This is the basic principle of a fuel cell. Several types of fuel cell are used in accordance with a mode for realizing the basic principle. The following types of cells are generally listed: an alkaline fuel cell, a polymer electrolyte fuel cell, a phosphoric-acid fuel cell, a molten-carbonate fuel cell, and a solid-oxide fuel cell.

A polymer electrolyte fuel cell (hereafter referred to as PEFC) is described below, which is one of the above fuel cells. FIG. 4 is a cross-sectional view of a cell 1 of a PEFC. A gas diffusion layer 13 is interposed between an anode-side collector 12 and an anode (electrode catalyst layer) 14, and a gas diffusion layer 23 is interposed between a cathode-side collector 22 and a cathode (electrode catalyst layer) 24. An electrolyte membrane 10 is a cation-exchange membrane. The anode-side collector 12 (cathode-side collector 22) is carbon paper containing 30% by mass of a tetrafluoroethylene-hexafluoropropylene copolymer (FEP), in which carbon paper is for example, impregnated with a 60%-by-mass solution of the FEP, then heat-treated at 360° C. for one hour, and formed into a predetermined dimension. The anode 14 (cathode 24) is made of a mixture of catalyst-supporting carbon and an ion-conducting material.

The gas diffusion layers 13 and 23 are a layer formed by applying a water-repelling treatment to carbon paper with fluorocarbon resin or the like, a layer formed by mixing carbon and a hydrophobic material such as fluorocarbon resin to mold, or a layer formed by applying a water-repelling treatment to a mixture of carbon and a hydrophobic material such as fluorocarbon resin on the surface of carbon paper treated for water-repellent with fluorocarbon resin or the like.

A PEFC supplies a reactant gas respectively to the above anode 14 and cathode 24, and generates power on the basis of oxidation reaction and reduction reaction of the following electrochemical reactions 1 and 2.

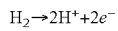  (Electrochemical reaction 1)

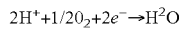  (Electrochemical reaction 2)

The PEFC is characterized in that a high output can be obtained though the operating temperature is relatively low compared to those of other types of fuel cells.

In the case of the PEFC, when a fuel and an oxidizing gas are introduced into the anode side and cathode side respectively, H+ (hereafter referred to as proton) is generated in the anode 14 on the basis of the electrochemical reaction 1 and moved in the electrolyte membrane 10 from the anode side to the cathode side together with water. In the cathode 24, water is produced by protons and oxygen on the basis of the electrochemical reaction 2. In the case of the PEFC, electrical energy can be obtained by taking out electrons generated together with protons from the anode 14 and supplying them to the cathode 24. Moreover, since the electrolyte membrane 10 shows conductivity while it is wet, a reactant gas is humidified and supplied to the cell 1 in general.

The following four functions are requested for the gas diffusion layers 13 and 23 of the cell 1.

The first point is a gas diffusion property (permeability). This is a function indispensable for a reactant gas to pass through the gas diffusion layers 13 and 23, efficiently come into contact with the electrode catalysts of the electrode catalyst layers 14 and 24, and cause an electrochemical reaction.

The second point is a water-repelling function. When the gas diffusion layers 13 and 23 respectively have a high hygroscopicity, the gas diffusion property is deteriorated because moisture in a reactant gas humidified and supplied and reaction-produced water are absorbed under PEFC power generation. Therefore, in order to realize a high-performance PEFC, water-repelling function of the gas diffusion layers 13 and 23 is also indispensable.

The third point is an electron-conducting function. This is an indispensable function for delivering electrons generated on the basis of an electrochemical reaction to an external circuit and taking in electrons from an external circuit.

The fourth point is a water-holding property. When the water-holding property is deteriorated, the electrode catalyst layers 14 and 24 or the electrolyte membrane 10 are or is dried and the ion conductivity is deteriorated. Therefore, the water-holding property is also indispensable in order to realize a high-performance PEFC.

So as to provide with the above basic four functions, a layer formed by applying a water-repelling treatment to carbon paper with fluorocarbon resin or the like is used for the conventional gas diffusion layers 13 and 23 respectively.

However, a PEFC tends to greatly change in the direction in which a cell voltage is lowered due to fluctuations in external factors such as a humidified degree of a reactant gas, a quantity of a reactant gas to be supplied, and a cell temperature under power generation. In the case of the cell 1 using the conventional gas diffusion layers 13 and 23 formed by applying a water-repelling treatment to carbon paper with fluorocarbon resin, a problem is caused that a cell voltage tends to remarkably lower under a low temperature (room temperature to 50° C.).

Therefore, it is an object of the present invention to provide a fuel cell having a cell provided with a gas diffusion layer capable of preventing a cell voltage from being lowered due to external factors by improving a conventional gas diffusion layer.

DISCLOSURE OF THE INVENTION

As a result of performing earnest study in order to solve the conventional problems, the present inventor et al. find that by using a gas diffusion layer containing carbon having a specific oil absorption volume, preferably by using a gas diffusion layer having a new structure, it is possible to prevent a cell voltage from being lowered due to external factors and prevent a cell voltage from being lowered also when a cell temperature is low (room temperature to 50° C.) and realize the present invention.

That is, claim 1 of the present invention discloses a fuel cell constituted by arranging an anode-side collector, an anode (electrode catalyst layer), an electrolyte membrane, a cathode (electrode catalyst layer), and a cathode-side collector, characterized in that a gas diffusion layer containing carbon having an oil absorption volume larger than that of the catalyst-supporting carbon used for the electrode catalyst layers is interposed between the collectors and the electrode catalyst layers on at least either the cathode (electrode catalyst layer) or the anode (electrode catalyst layer).

claim 2 of the present invention is characterized in that concaves and convexes are formed on at least one side face of the gas diffusion layer in the fuel cell of claim 1.

claim 3 of the present invention is characterized in that the gas diffusion layer comprises a hydrophobic material and the carbon in the fuel cell of claim 1 or 2.

claim 4 of the present invention is characterized in that the content of the hydrophobic material ranges from 0.5% to 50% by mass in the fuel cell of claim 3.

claim 5 of the present invention is characterized in that the hydrophobic material is selected from a group composed of polytetrafluoroethylene (PTFE), tetrafluoroethylene-perfluoroalkylvinly-ether copolymer (PFA), tetrafluoroethylene-hexafluoropropylene copolymer (FEP), polycholotrifuoroethylene (PCTFE), polyvinylidene fluoride (PVDF), polyvinyl fluoride (PVF), and tetrafluoroethylene-ethylene copolymer (ETFE) in the fuel cell of claim 3 or 4.

claim 6 of the present invention is characterized in that the intervals between concaves and convexes range between 55 and 200 μm in the fuel cell of claim 2.

A PEFC having a cell provided with an improved gas diffusion layer to which the present invention is applied is specifically described below by referring to the accompanying drawings.

FIG. 1 is a cross-sectional view of a cell 1A of a PEFC of the present invention. A gas diffusion layer 13 is interposed between an anode-side collector 12 and an anode (electrode catalyst layer) 14 and, a gas diffusion layer 23 is interposed between a cathode-side collector 22 and a cathode (electrode catalyst layer) 24. The gas diffusion layers 13 and 23 comprise layers containing carbon having an oil absorption volume larger than that of the catalyst-supporting carbon of the electrode catalyst layers 14 and 24. As described above, in a fuel cell using the conventional gas diffusion layers 13 and 23 shown in FIG. 4 respectively obtained by applying a mixture of carbon and a hydrophobic material such as fluorocarbon resin to the surface of carbon paper treated for water-repellent with fluorocarbon resin or the like, as the examined test of causes for a cell voltage to lower, the present inventor et al found that one of the causes was stay of reaction-produced water, condensed water, moving water, or inversely-diffused water in the electrodes (electrode catalyst layers) 14 and 24 due to a factor such as a cell temperature or on the contrary, or drying of the electrodes (electrode catalyst layers) 14 and 24 and the electrolyte membrane 10.

That is, it was estimated that, when a cell temperature was too low or water was excessively supplied to the cell 1, supply of a reactant gas to the electrodes (electrode catalyst layers) 14 and 24 was prevented due to reaction-produced water, moving water, or inversely-diffused water stayed in the electrodes (electrode catalyst layers) 14 and 24 and thereby a cell voltage was lowered. On the contrary, when a cell temperature was too high or the quantity of supplied water was too small, the water volume held in the cell 1 becomes insufficient, the electrodes (electrode catalyst layers) 14, 24 and the electrolyte membrane 10 were dried and the cell voltage was lowered.

As a result of using the gas diffusion layers 13 and 23 containing carbon having an oil absorption volume larger than that of the catalyst-supporting carbon of the electrodes (electrode catalyst layers) 14 and 24 on the basis of the above knowledge, it was possible to suppress lowering of a cell voltage due to external factors. This is because stay of water in the electrodes (electrode catalyst layers) 14 and 24 or drying of the electrodes (electrode catalyst layers) 14 and 24 and the electrolyte membrane 10 due to fluctuations of external factors is suppressed by the gas diffusion layers 13 and 23 used for the present invention.

Reaction-produced water tends to stay in the electrode (electrode catalyst layer) 24 at the cathode side. Therefore, by arranging the gas diffusion layer 23 used for the present invention to at least the cathode (electrode catalyst layer) 24, the effect thereof remarkably appears.

It is preferable that the gas diffusion layers 13 and 23 used for the present invention comprise carbon having an oil absorption volume larger than that of the catalyst-supporting carbon of the electrodes (electrode catalyst layers) 14 and 24, and a hydrophobic material. By combining the former carbon with the hydrophobic material, it is possible to arrange a capillary water passage, a water-holding portion, a water-repelling capillary gas passage, and an electron-conducting passage in the gas diffusion layers 13 and 24.

It is preferable that the content of the hydrophobic material is 0.5% to 50% by mass and more preferable that the content of the hydrophobic material is 1% to 40% by mass. When the content of the hydrophobic material is less than 0.5% by mass, a water-repelling capillary gas path may not be completely formed. However, when the content of the hydrophobic material exceeds 50% by mass, a capillary water passage and an electron-conducting passage or a water-holding portion may not be completely formed.

As a specific preferable hydrophobic material capable of forming a water-repelling capillary gas path, fluorocarbon resin selected from the following materials can be used: polytetrafluoroethylene (PTFE), tetrafluoroethylene-perfluoroalkylvinly-ether copolymer (PFA), tetrafluoroethylene-hexafluoropropylene copolymer (FEP), polycholotrifuoroethylene (PCTFE), polyvinylidene fluoride (PVDF), polyvinyl fluoride (PVF), and tetrafluoroethylene-ethylene copolymer (ETFE).

As a specific example of the preferable carbon for forming a capillary water passage and an electron-conducting passage or a water-holding portion, the following can be used: carbon powder such as furnace black (Vulcan XC-72 [made by Cabot Inc.] as typical product) or acetylene black (DENKA black [made by DENKI KAGAKU KOGYO K.K.] as typical product).

The anode-side collector 12 (cathode-side collector 22) uses carbon paper having an FEP content of 30% by mass obtained by impregnating the carbon paper with 60% by mass of tetrafluoroethylene-hexafluoropropylene copolymer (FEP) and then heat-treating the paper at 360° C. for one hour and forming the paper into predetermined dimensions.

The anode 14 (cathode 24) is made of a mixture of catalyst-supporting carbon and an ion-conducting material. The electrolyte membrane 10 is a cation-exchange membrane.

Even when water is excessively supplied to the cathode side, the diffusion passage of a reactant gas is secured by a capillary gas passage defined by a hydrophobic material in the gas diffusion layer 23 composed of carbon having an oil absorption volume larger than that of the catalyst-supporting carbon of the electrode (electrode catalyst layer) 24 and the hydrophobic material. However, since the capillary water passage defined by the carbon is formed by using the carbon having an oil absorption volume larger than that of the catalyst-supporting carbon, the water-absorbing pressure of the water passage in the gas diffusion layer 23 is higher than that of the catalyst-supporting carbon of the cathode (electrode catalyst layer) 24 and the produced water and moving water in the cathode (electrode catalyst layer) are attracted into the water passage in the gas diffusion layer 23 and discharged toward the cathode-side collector 22.

When a cell temperature is low, the evaporation speed of water from the collectors 12 and 22 is lowered. However, the produced water and moving water in the cathode (electrode catalyst layer) 24 are physically attracted on the basis of the water-absorbing pressure of the gas diffusion layer 23 and discharged toward the cathode-side collector 22.

As shown in FIG. 1, when forming concaves and convexes 25 on the interface between the cathode (electrode catalyst layer) 24 and the gas diffusion layer 23 and the interface between the anode (electrode catalyst layer) 14 and the gas diffusion layer 13 and increasing the contact area between them in order to make the water-absorbing pressure difference more effectively function, discharge performances of produced water and moving water in the cathode (electrode catalyst layer) 24 are further improved.

Moreover, as shown in FIG. 1, by forming concaves and convexes 26 at the collectors 12 and 22 of the gas diffusion layers 13 and 23 in order to increase the evaporation speed of water from the gas diffusion layers 13 and 23 even when a cell temperature is low as shown in FIG. 1, it is possible to increase an evaporation area and improve the discharge performance to the outside of the cell 1A.

It is preferable that the interval between the concaves or convexes 25 and the interval between the concaves or convexes 26 respectively ranges from 55 to 200 μm and more preferable that the intervals respectively range from 90 to 150 μm. The interval between concaves or convexes 25 and the interval between the concaves or convexes 26 respectively denote the interval between a convex and the next convex or the interval between a concave and the next concave. When forming the concaves and convexes 25 and concaves and convexes 26 by pressing a screen against them as the case of an embodiment to be described later, the interval between the concaves and convexes 25 and the interval between the concaves and convexes 26 respectively correspond to the interval (opening) between lines of a screen (net) used.

BRIEF DESCRIPTION OF THE DRAWINGS

In FIGS. 1 and 4, symbols 1 and 1A denote cells, 10 denotes an electrolyte membrane, 12 denotes an anode-side collector, 13 and 23 denote gas diffusion layers, 14 denotes an anode (electrode catalyst layer), 22 denotes a cathode-side collector, 24 denotes a cathode (electrode catalyst layer), and 25 and 26 denote concaves and convexes.

BEST MODE FOR CARRYING OUT THE INVENTION

Figure 1:
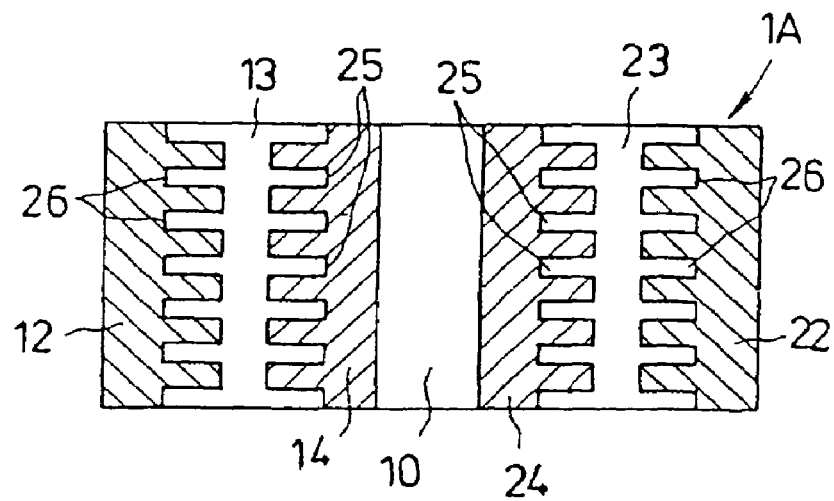
FIG. 1 is a cross-sectional view of a cell of the polymer electrolyte fuel cell of an embodiment.
Figure 4:
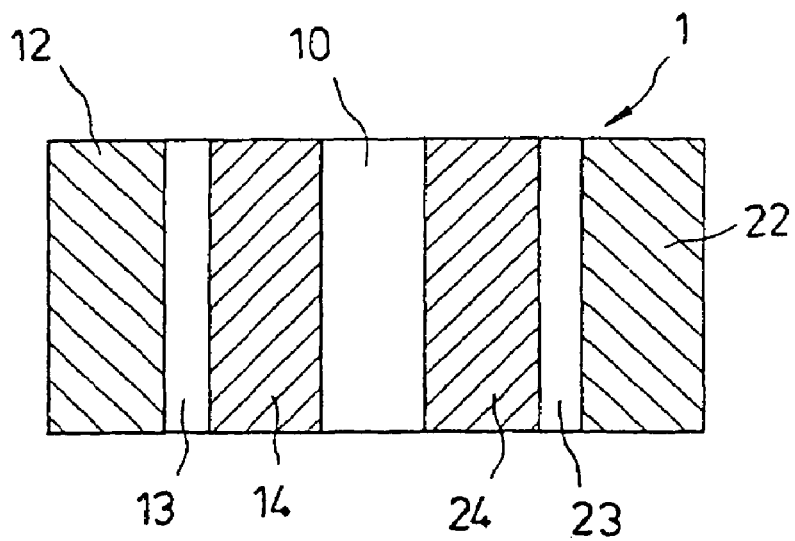
FIG. 4 is a cross-sectional view of a cell of a conventional polymer electrolyte fuel cell.

The present invention is more minutely described below in accordance with embodiments and comparative examples. However, the present invention is not restricted to the embodiments.

(Embodiment 1)

<Fabrication of Collectors 12 and 22>

The collectors 12 and 22 are fabricated by impregnating the collectors 12 and 22 with a 60%-by-mass solution of tetrafluoroethylene-hexafluoropropylene copolymer (FEP), then heat-treating the collectors 12 and 22 at 360° C. for one hour, and forming them into predetermined dimensions.

<Formation of Gas Diffusion Layers 13 and 23>

The gas diffusion layers 13 and 23 are formed by forming a composition prepared by mixing BLACK PEARLS 2000 having an oil absorption volume of 330 cc/100 g, a 60%-by-mass PTFE solution, and kerosene so that the PTFE content becomes 30% by mass on the collectors 12 and 22 on the basis of the publicly-known screen printing method.

When performing screen-printing, the concaves and convexes 26 are formed on the gas diffusion layers 13 and 23 at the collectors 12 and 22 by making the composition enter the collectors 12 and 22. Therefore, printing is performed while performing attracting from the back of a screen printing face. Moreover, after performing screen printing, the concaves and convexes 25 are formed at the electrode catalyst layers 14 and 24 by pressing a 100-mesh screen from upper portions of the printing faces of the gas diffusion layers 13 and 23. Then, the collectors 12 and 22 provided with the gas diffusion layers 13 and 23 are fabricated by heat-treating the collectors 12 and 22 at 360° C. for one hour and forming them into predetermined dimensions.

<Formation of Electrode Catalyst Layers 14 and 24>

The anode (electrode catalyst layer) 14 and cathode (electrode catalyst layer) 24 are formed on the collectors 12 and 22 provided with the gas diffusion layers 13 and 23 by forming platinum-supporting carbon (Pt/C) and Nafion (trade name) into a composition having a Nafion (trade name) quantity of 10% by mass and using the composition and the publicly-known screen printing method.

The carbon made of the platinum-supporting carbon (Pt/C) uses Vulcan XC-72 (oil absorption volume: 174 cc/100 g) having an oil absorption volume smaller than that of BLACK PERRLS 2000 having an oil absorption volume of 330 cc/100 g used for the gas diffusion layers 13 and 23.

While bringing the electrodes (electrode catalyst layers) 14 and 24 into contact with the membrane 10, the cell 1A is formed by contact-bonding them on the basis of the hot pressing method (temperature of 150° C., pressure of 6.9 MPa, and treatment time of 90 sec).

<Experiment 1>

Figure 2:
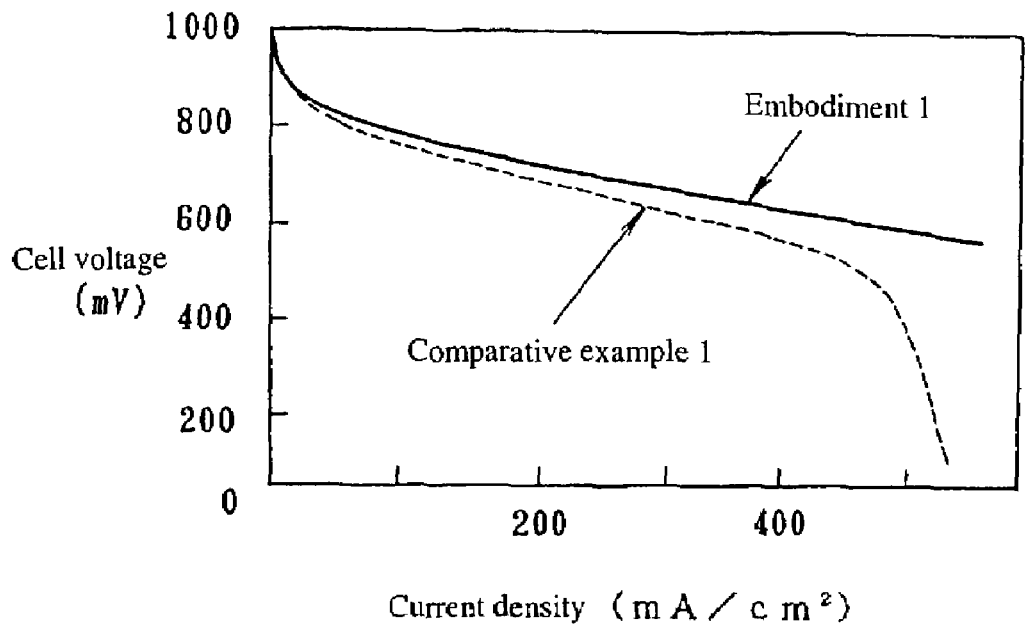
FIG. 2 is an illustration of graphs showing relations of cell voltages to current densities of the polymer electrolyte fuel cell of an embodiment of the present invention and the polymer electrolyte fuel cell of a comparative example.

FIG. 2 shows a result of performing a test for obtaining current-voltage characteristics under the following cell-testing conditions by using the cell 1A thus formed.

(Cell-Testing Conditions)

Electrode area: 25 cm$^2$

Fuel: $H_2$

Oxidizing-gas: air

Cell temperature: 50° C.

Fuel-humidifying temperature: 50° C.

Oxidizing-gas-humidifying temperature: 50° C.

<Experiment 2>

Figure 3:
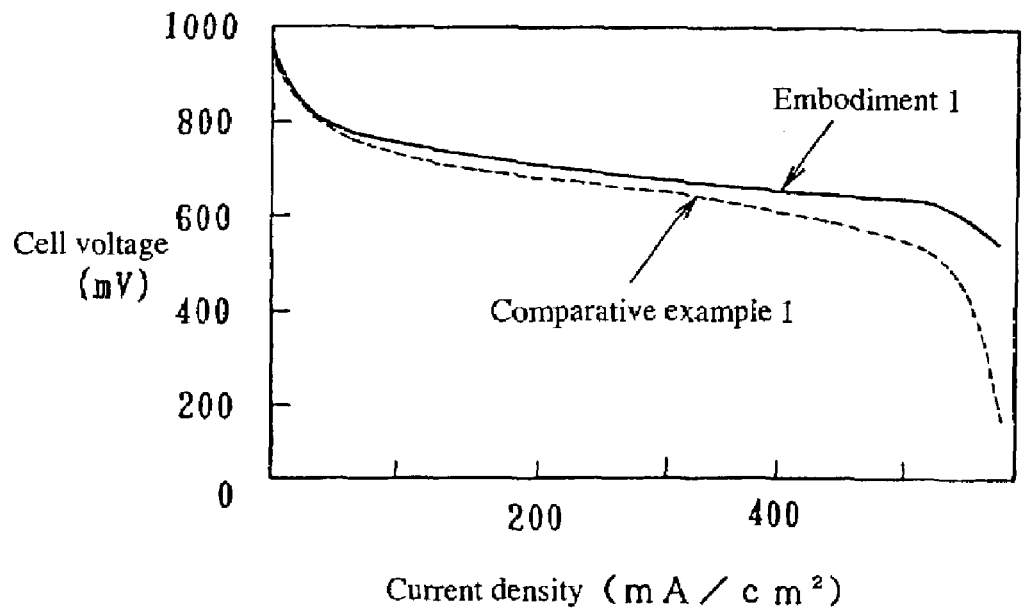
FIG. 3 is an illustration of graphs showing relations of cell voltages to current densities of the polymer electrolyte fuel cell of an embodiment of the present invention and the polymer electrolyte fuel cell of a comparative example under another test condition.

FIG. 3 shows a result of performing a test for obtaining current-voltage characteristics under the following cell-testing conditions by using the cell 1A.

(Cell-Testing Conditions)

Electrode area: 25 cm$^2$

Fuel: H$_2$

Oxidizing-gas: air

Cell temperature: 80° C.

Fuel-humidifying temperature: 80° C.

Oxidizing-gas-humidifying temperature: 85° C.

COMPARATIVE EXAMPLE 1

A cell 1B for comparison is formed under the same conditions as the case of the embodiment 1 except that the gas diffusion layers 13 and 23 respectively use BLACK PEARLS 800 (oil absorption volume: 68cc/100 g) having an oil absorption volume smaller than that of the Vulcan XC-72 (oil absorption volume: 174cc/100 g) used for the platinum-supporting carbon (Pt/C).

FIGS. 2 and 3 show results of obtaining current-voltage characteristics by using the cell 1B and thereby performing the experiments 1 and 2 similarly to the case of the embodiment 1.

From FIG. 2, it is found that the cell 1A shows a cell voltage more preferable than that of the cell 1B of the comparative example 1 even under an over-humidified state in which a cell temperature is a low temperature of 50° C. and a fuel-humidifying temperature and a humidified quantity of an oxidizing gas are 50° C. Particularly, in the case of the cell 1A of the embodiment 1, the lowering rate of a cell voltage is small in a region having a large current density and thereby, the effect is remarkable.

From FIG. 3, it is found that the cell 1A of the embodiment 1 shows a cell voltage more preferable than that of the cell 1B of the comparative example 1 even under an over-humidified state in which an oxidizing-gas-humidifying temperature is 85° C. to a cell temperature of 80° C. Particularly, the effect of the cell 1A of the embodiment 1 is remarkable because the lowering rate of a cell voltage in a region having a large current density is small.

This embodiment uses Vulcan XC-72 (oil absorption volume: 174cc/100 g) for the electrodes (electrode catalyst layers) 14 and 24. For example, however, when using BLACK PEARLS 1100 (oil absorption volume: 500cc/100 g) for electrodes (electrode catalyst layers 14 and 24), it is possible to use BLACK PEARLS 800 (oil absorption volume: 68cc/100 g) for the gas diffusion layers 13 and 23. Thus, it is possible to properly select a combination of types of carbon used for the gas diffusion layers 13 and 23 and the electrodes (electrode catalyst layers) 14 and 24.

<Material of Anode Catalyst>

Moreover, for this embodiment, a case is described in which simplex platinum (Pt) is used as an anode catalyst. However, it is also allowed to use ruthenium (Ru) and moreover, it is allowed to use one of general catalyst materials such as gold (Au), silver (Ag), palladium (Pd), and rhodium (Rh) or an alloy of these materials. Furthermore, it is allowed to use an alloy obtained by adding one of the catalyst materials such as iron (Fe), nickel (Ni), chromium (Cr), molybdenum (Mo), iridium (Ir) gallium (Ga), titanium (Ti), vanadium (V), aluminum (Al), and tin (Sn) to the catalyst material.

<Material of Cathode Catalyst>

Furthermore, for this embodiment, a case is described in which simplex platinum (Pt) is used for a cathode catalyst. However, it is also allowed to use an alloy obtained by adding one of the catalyst materials such as nickel (Ni), iron (Fe), copper (Cu), chromium (Cr), vanadium (V), gold (Au), silver (Ag), palladium (Pd), rhodium (Rh), iridium (Ir), gallium (Ga), titanium (Ti), aluminum (Al), and tin (Sn).

Moreover, this embodiment uses a PEFC as a fuel cell of the present invention. However, a fuel cell of the present invention is not restricted to the PEFC but it includes an alkaline fuel cell and a phosphoric-acid fuel cell.

(Embodiment 2)

A cell 1C is formed similarly to the case of the embodiment 1 except that a 100-mesh screen (net) is not used or concaves and convexes 25 are not formed on the gas diffusion layers 13 and 23.

<Experiment 3>

Table 1 shows results of performing tests for obtaining cell voltages under the following cell-testing conditions by using the cell 1C thus formed. Moreover, Table 1 shows inch meshes of screens (nets) used, line diameters (μm), thicknesses (μm) and openings (μm).

(Cell-Testing Conditions)

Electrode area: 25 cm$^2$

Fuel: H$_2$

Oxidizing-gas: air

Cell temperature: 50° C.

Fuel-humidifying temperature: 50° C.

Oxidizing-gas-humidifying temperature: 50° C.

Current density: 500 mA/cm$^2$ (Comparative Example 2)

Table 1 shows results of performing tests for obtaining cell voltages of the cell 1B formed for the comparative example 1 under the cell-testing conditions of the above experiment 3.

(Embodiments 3 to 10)

Table 1 shows results of performing tests for obtaining cell voltages under the cell-testing conditions of the above experiment 3 by forming cells similarly to the case of the embodiment 1 except that screens (nets) of 50 to 400 meshes are used.

TABLE 1

| | Inch mesh | Line diameter (μm) | Thickness (μm) | Opening (μm) | Cell voltage (mV) |
|---|---|---|---|---|---|
| Comparative example 2 | 100 | 101 | 225 | 153 | 380 |
| Embodiment 2 | — | — | — | — | 570 |
| Embodiment 3 | 50 | 193 | 415 | 315 | 570 |
| Embodiment 4 | 60 | 115 | 275 | 271 | 570 |
| Embodiment 5 | 80 | 121 | 237 | 196 | 580 |
| Embodiment 6 | 100 | 101 | 225 | 153 | 590 |
| Embodiment 7 | 200 | 40 | 84 | 87 | 590 |
| Embodiment 8 | 250 | 35 | 73 | 87 | 580 |
| Embodiment 9 | 300 | 30 | 70 | 55 | 580 |
| Embodiment 10 | 400 | 23 | 52 | 41 | 570 |

From Table 1, it is found that when using Vulcan XC-72 (oil absorption volume: 174 cc/100 g) having an oil absorption volume smaller than that of the BLACK PERRLS 2000 having an oil absorption volume of 300 cc/100 g used for a gas diffusion layer as the carbon used for platinum-supporting carbon (Pt/C), a cell voltage of even the embodiment 2 not provided with concaves and convexes by a screen (net) is improved compared to the case of the comparative example 2. In the case of the embodiments 3 to 10, a cell voltage is improved compared to the case of the comparative example 2. Moreover, it is found that a cell voltage is further improved in the case of the embodiment 5 (80 mesh) to embodiment 9 (300 mesh) and a cell voltage is still further improved in the case of the embodiment 6 (100 mesh) to embodiment 7 (200 mesh).

In the case of the fuel cell of claim 1 of the present invention, a gas diffusion layer containing the carbon having an oil absorption volume larger than that of the catalyst-supporting carbon used for an electrode catalyst layer between a collector and an electrode catalyst layer is formed on at least either a cathode (electrode catalyst layer) or an anode (electrode catalyst layer). Therefore, it is possible to prevent a cell voltage from being lowered due to an external factor and prevent a cell voltage from being lowered even when a cell temperature is low (room temperature to 50° C.).

Moreover, in the case of the fuel cell of claim 1 of the present invention, the water-absorbing pressure of the water passage of a gas diffusion layer is higher than that of an electrode catalyst layer and for example, the produced water and moving water in a cathode are attracted by a gas diffusion-layer water passage and discharged toward a collector. When a cell temperature is low, the evaporation speed of water from the collector side is lowered. For example, however, produced water and moving water in a cathode are physically attracted by the water-absorbing pressure of a gas diffusion layer and discharged toward a collector. Therefore, an advantage is obtained that it is possible to prevent a cell voltage from lowering.

In the case of the fuel cell of claim 2 of the present invention, since concaves and convexes are formed at least one side face of the gas diffusion layer, advantages are obtained that it is possible to increase the contact area between the gas diffusion layer and an electrode catalyst layer or between the gas diffusion layer and a collector, the discharge performances of produced water and moving water in an electrode catalyst layer are further improved, and it is possible to increase the evaporation speed of water from the gas diffusion layer even if a cell temperature is low and improve the discharge performance of water to the outside of a cell.

In the case of the fuel cell of claim 3 of the present invention, the gas diffusion layer comprises a hydrophobic material and the carbon. Therefore, even if water is excessively supplied to the cathode side, the diffusion passage of a reactant gas is secured by a capillary gas passage defined by a hydrophobic material. Since a capillary water passage is defined by carbon having an oil absorption volume larger than that of catalyst-supporting carbon, the water-absorbing pressure of a gas diffusion-layer water passage is higher than that of a cathode, and produced water and moving water in the cathode are attracted by the gas diffusion-layer water passage and discharged toward a collector. Moreover, when a cell temperature is low, the evaporation speed of water from the collector side is lowered. However, the produced water and moving water in the cathode are physically attracted by the water-absorbing pressure of the gas diffusion layer and discharge to the collector side. Furthermore, even if a cell temperature is low, an advantage is obtained that it is possible to prevent a cell voltage from lowering.

In the case of the fuel cell of claim 4 of the present invention, since the content of the hydrophobic material is set in a proper range from 0.5% to 50% by mass. Therefore, a repellent capillary gas passage is completely formed and moreover, a capillary water passage, an electron-conducting passage, a water-holding portion are completely formed. Therefore, for example, even if water is excessively supplied to the cathode side, a reactant gas diffusion passage is more-properly secured by a capillary gas passage defined by a hydrophobic material and the water absorbing pressure of a gas diffusion-layer water passage becomes higher than that of a cathode and the produced water and moving water in the cathode are attracted by the gas diffusion-layer water passage and more properly discharged to the collector side because a capillary water passage is defined by the carbon having an oil absorption volume larger than that of catalyst-supporting carbon. When a cell temperature is low, the evaporation speed of water from the collector side is lowered. However, because the produced water and moving water in a cathode are physically attracted due to the water-absorbing pressure of a gas diffusion layer and more properly discharged by the collector side. Therefore, an advantage is obtained that it is possible to prevent a cell voltage from lowering even if the cell temperature is low.

The fuel cell of claim 5 of the present invention is easily available and economical because the hydrophobic material is selected from a group composed of polytetrafluoroethylene (PTFE), tetrafluoroethylene-perfluoroalkylvinly-ether copolymer (PFA), tetrafluoroethylene-hexafluoropropylene copolymer (FEP), polycholotrifuoroethylene (PCTFE), polyvinylidene fluoride (PVDF), polyvinyl fluoride (PVF), and tetrafluoroethylene-ethylene copolymer (ETFE).

In the case of the fuel cell of claim 6 of the present invention, intervals between the concaves and convexes range from 55 to 200 μm. Therefore, it is possible to efficiently increase the contact area between a gas diffusion layer and an electrode catalyst layer or between the gas diffusion layer and a collector, discharge performances of the produced water and moving water in the electrode catalyst layer are further improved. Moreover, when a cell temperature is low, it is possible to further increase the evaporation speed of water from the gas diffusion layer and further improve the discharge performance of water to the outside of a cell.

INDUSTRIAL APPLICABILITY

A conventional fuel cell tends to greatly change in the direction for a cell voltage to lower due to fluctuations of external factors such as a quantity of humidified reactant gas under power generation, a quantity of reactant reactive gas to be supplied, and a cell temperature. In the case of a cell using a conventional gas diffusion layer formed by applying a water-repelling treatment to carbon paper with fluorocarbon resin, a cell voltage tends to lower at a low temperature (room temperature to 50° C.). In the case of a fuel cell of the present invention, however, it is possible to prevent a cell voltage from being lowered due to external factors because the fuel cell has a cell obtained by improving a conventional gas diffusion layer so as to be able to prevent the cell voltage from being lowered due to external factors. Even if a cell temperature is low (room temperature to 50° C.), an advantage capable of preventing a cell voltage from being lowered is obtained and therefore, a fuel cell of the prevent invention has a very-large industrial utilization value.

The invention claimed is:

1. A fuel cell comprising: an anode-side collector, an anode comprising an electrode catalyst layer containing catalyst-supporting carbon, an electrolyte membrane, a cathode comprising an electrode catalyst layer containing catalyst-supporting carbon, a cathode-side collector arranged in the order stated, further including a gas diffusion layer containing carbon having an oil absorption volume per unit weight of carbon which is larger than an oil absorption volume per unit weight of the carbon of the catalyst-supporting carbon of at least one of the anode and the cathode, the gas diffusion layer being interposed between a collector and at least one of the cathode and the anode and having concaves and convexes formed on at least one face thereof, wherein intervals between said concaves and convexes are constant and are in the range of 55 to 200 µm.

2. The fuel cell according to claim 1, wherein said gas diffusion layer comprises a hydrophobic material and said carbon.

3. The fuel cell according to claim 2, wherein a content of said hydrophobic material ranges from 0.5% to 50% by mass.

4. The fuel cell according to claim 2 or 3, wherein said hydrophobic material is selected from a group composed of polytetrafluoroethylene (PTFE), tetrafluoroethylene-perfluoroalkylvinyl-ether copolymer (PFA), tetrafluoroethylene-hexafluoropropylene copolymer (FEP), polychlorotrifluoroethylene (PCTFE), polyvinylidene fluoride (PVDF), polyvinyl fluoride (PVF), and tetrafluoroethylene-ethylene copolymer (ETFE).

* * * * *